United States Patent [19]

Cichetti, Jr.

[11] 3,824,543

[45] July 16, 1974

[54] DIGITAL DATA INTERCHANGE CIRCUIT FOR A MULTIPLEXER/DEMULTIPLEXER

[75] Inventor: Michael Peter Cichetti, Jr., Staten Island, N.Y.

[73] Assignee: Bell Telephone Laboratories, Incorporated, Murray Hill, N.J.

[22] Filed: June 26, 1973

[21] Appl. No.: 373,633

[52] U.S. Cl. ........................ 340/147 CN, 340/147 C
[51] Int. Cl. ........................ H04q 1/00
[58] Field of Search ................. 340/147 CN, 147 C; 179/18 ET

[56] References Cited

UNITED STATES PATENTS 3,772,651 11/1973 Thyssens ...................... 340/147 CN

*Primary Examiner*—Harold I. Pitts
*Attorney, Agent, or Firm*—Ray C. Lipton

[57] ABSTRACT

During a time-division highway frame, data signals from the incoming side of a plurality of lines are clocked into line registers while data signals from the incoming side of a two-way time-division highway previously stored in the line registers are clocked out to the outgoing side of the lines. At the same time, data signals from the incoming side of the time-division highway are distributed to the several portions of a highway register while data signals from the incoming lines previously stored in the highway register portions are transmitted to the outgoing side of the time division highway. After being distributed to a group of highway register portions, the data signals are recirculated through successive portions of the group while subsequent data signals are being distributed to the remaining groups of highway register portions. The data signals in the line registers and in the highway register portions are serially interchanged at the highway data rate while synchronizing signals are transmitted to the highway.

19 Claims, 5 Drawing Figures

DIGITAL DATA INTERCHANGE CIRCUIT FOR A MULTIPLEXER/DEMULTIPLEXER

FIELD OF THE INVENTION

This invention relates to time-division multiplex transmission systems and, more particularly, to apparatus for multiplexing digital signals from a plurality of incoming lines onto a time-division highway and for distributing digital signals from the time-division highway to a plurality of outgoing lines.

DESCRIPTION OF THE PRIOR ART

In known forms of communication systems, transmission highways accommodate a plurality of digital signal channels on a time-division multiplex basis. Users desiring access to such a communication system require terminal equipment capable of both placing digital signals on, and removing digital signals from, the time-division highway. Such equipment is normally divided into two portions; namely, a multiplexer for placing digital signals on the highway and a demultiplexer for removing digital signals from the highway.

Multiplexers and demultiplexers are well known in the art. Multiplexers assemble digital signals from a plurality of incoming lines, serialize the digital signals and insert each digital signal in a time slot in a frame on the time-division highway. Demultiplexers accept a stream of serial digital signals from the time-division highway, sort the serial stream into separate digital signals and distribute those separate digital signals to a plurality of outgoing lines.

Prior art multiplexers and demultiplexers employ well-known types of digital logic configurations to accomplish their aforementioned functions. Multiplexers typically employ a buffer, such as a shift register, for each incoming line to store the incoming digital signals. The digital signals stored in each line shift register are then transferred to a segment or portion of an outgoing highway shift register. The digital signals from the several incoming lines are thus interleaved to form a frame and shifted out to the time-division highway. Similarly, in demultiplexers, it is known to employ an incoming highway shift register to store serial digital signals from the time-division highway. The digital signals stored in each of the several portions of the incoming highway shift register are then transferred to corresponding line shift registers dedicated to each outgoing line. The line shift registers are then read out to the outgoing lines.

In the prior art, therefore, the multiplexer employs an outgoing highway register and a plurality of incoming line registers, while the demultiplexer employs an incoming highway register and a plurality of outgoing line registers. Much of the digital logic circuitry utilized in the multiplexer is thus duplicated in the demultiplexer. Since the multiplexer is used exclusively to transfer digital signals in one direction (from the lines to the time-division highway) while the demultiplexer is used exclusively to transfer digital signals in the other direction (from the time-division highway to the lines), this duplication has heretofore been unavoidable.

It is, therefore, an object of this invention to provide an improved multiplexer/demultiplexer wherein logic duplication is minimized. More specifically, it is an object of this invention to provide a bidirectional multiplexer/demultiplexer wherein common logic circuitry is used to transfer digital signals in two directions, thereby reducing the amount of logic circuitry heretofore required.

The technique of sharing common logic circuitry as a means of minimizing logic duplication has been employed in time slot interchangers. The function of a time slot interchanger is to interchange a digital signal occupying a first time slot in a time-division frame on one line with a digital signal occupying a second time slot in a time-division frame on a second line, both lines operating at the same data rate. It is known to accomplish the aforementioned function by the employment of a single register for each line, wherein each register contains a number of stages corresponding in number to the number of time slots in the time-division frame. During the time-division frame, digital signals obtained from the incoming side of each line are stored in the register, while digital signals previously stored in the register (and obtained from the other line) are simultaneously transmitted to the outgoing side of the line. Between frames, the digital signals stored in each register are interchanged, in a parallel fashion, by way of an array of logic gates which reorder the sequence of the digital signals by placing a digital signal from any one of the stages in the one register into any one of the stages of the other register.

In attempting to apply this latter technique to a bidirectional multiplexer/demultiplexer, however, the problem arises that line registers must operate at the line data rate while highway registers must operate at the highway data rate, which rates substantially differ.

It is, therefore, a further object of this invention to provide a simplified system of logic to interchange digital signals between data stores operating at different rates.

SUMMARY OF THE INVENTION

In the illustrative embodiment, in accordance with one object of this invention, the incoming and outgoing side of each line has dedicated thereto a single line register. The time-division highway register has a plurality of portions; equal in number to the number of line registers. During a first interval of the time-division frame, data signals from each incoming line are written into the line register, while data signals assembled from the highway and previously stored in the line register are simultaneously read out to the outgoing line. During this same interval, data signals from the highway are distributed to the several portions of the highway register while data signals assembled from the incoming lines and previously stored in the highway register are transmitted to the time-division highway. During a second interval of the time-division frame (while synchronizing signals are transmitted to the highway), the data signals from the highway stored in each of the several highway register portions are transferred to a particular one of the line registers, while the data signals from the incoming lines stored in each of the line registers are simultaneously transferred to a particular one of the highway register portions. To simplify the logic necessary to affect this transfer, between a line register and a highway register portion, a serial interchange is advantageously provided by a single path between the line registers and the highway register portions.

In accordance with another feature of this invention, data signals are read from the lines into the line registers and read from the line registers out to the lines at the low line data rate, while data signals are read from the time-division highway into the highway register and read from the highway register out to the time-division highway at the higher highway data rate. During the second interval of the time-division frame, data signals are serially interchanged between the line registers and the highway register portions at the higher highway data rate. More specifically, data signals are serially read out from the output of each line register into a particular one of the highway register portions and data signals are serially read out from the output of each highway register portion into a particular one of the line registers at the higher highway data rate. During the first interval, the line registers are clocked at the line data rate by a first clock source while the highway register is clocked at the highway data rate by a second clock source. During the second interval, the output of the first clock source and the output of the second clock source are advantageously combined, such that both the line registers and the highway register are clocked at the highway data rate.

In accordance with another aspect of this invention, successive highway register portions are arranged into groups of portions. Data signals from the time-division highway are distributed to successive groups of portions during the first interval. During the remaining part of the first interval, the data signals stored in each group of portions are recirculated through the successive portions of the group while data signals are being distributed to the remaining groups of highway register portions.

The foregoing and other objects and features of this invention will be more fully understood from the following description of an illustrative embodiment thereof taken in conjunction with the accompanying drawings.

DETAILED DESCRIPTION

Figure 1:
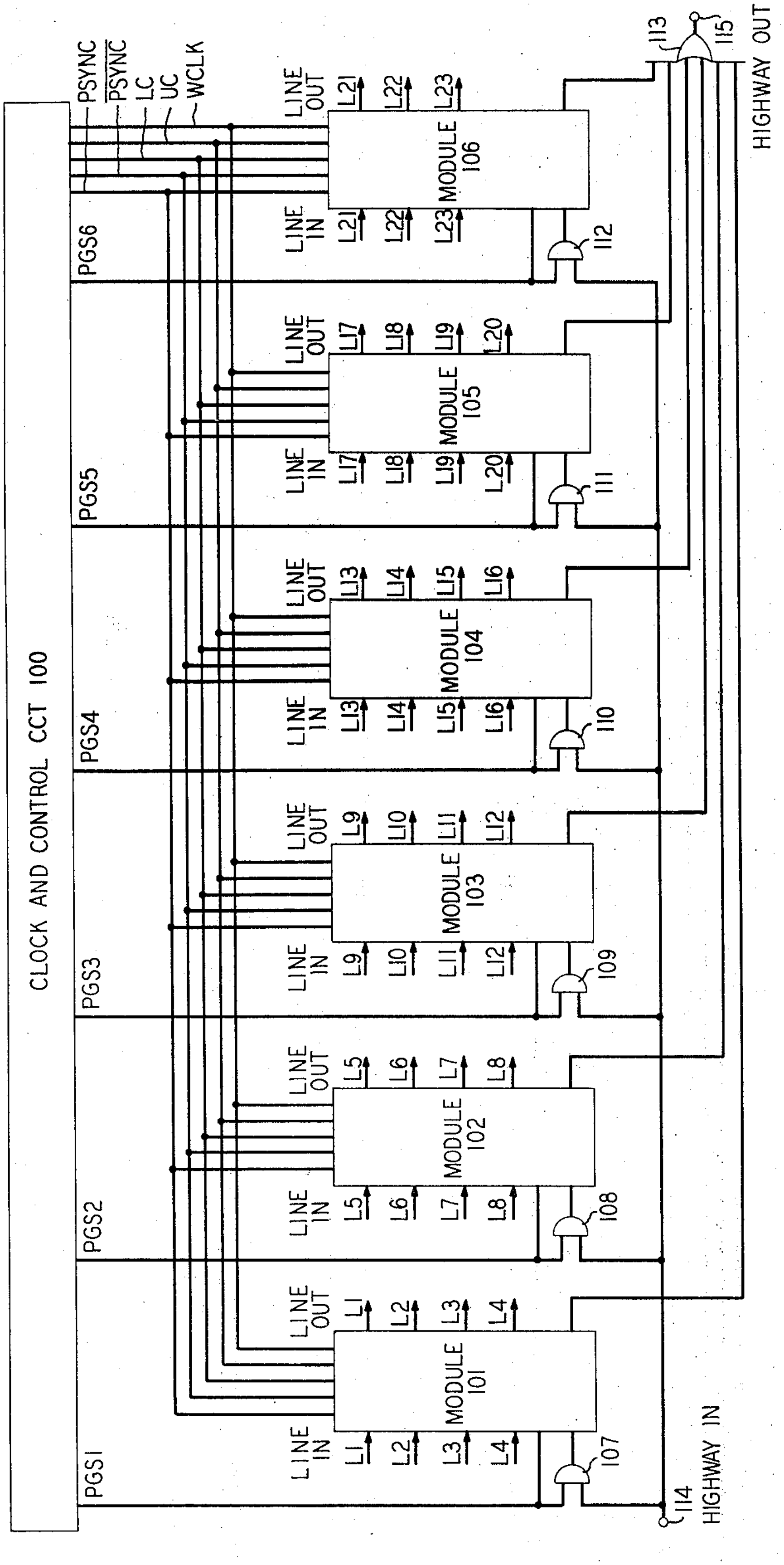
FIG. 1 depicts, in block schematic form, a bidirectional multiplexer/demultiplexer in accordance with this invention.

Refer to FIG. 1. The blocks shown therein represent apparatus used to assemble data signals from the incoming side of a plurality of two-way lines (L1 to L23) for transmission to the outgoing side of a two-way time-division highway (terminal 115), and to accept data signals from the incoming side of the time-division highway (terminal 114) for distribution to the outgoing side of the lines. Each line advantageously carries data signals in the form of multibit data bytes in a time-division sequence. Each data byte from each incoming line preferably consists of eight bits assembled and placed in a time slot of a frame on the outgoing side of the time-division highway; time slots in each frame being reserved for individual lines. Conversely, the data byte in each time slot on the incoming side of the highway is dissassembled and applied to the outgoing side of the corresponding line.

Figure 2:
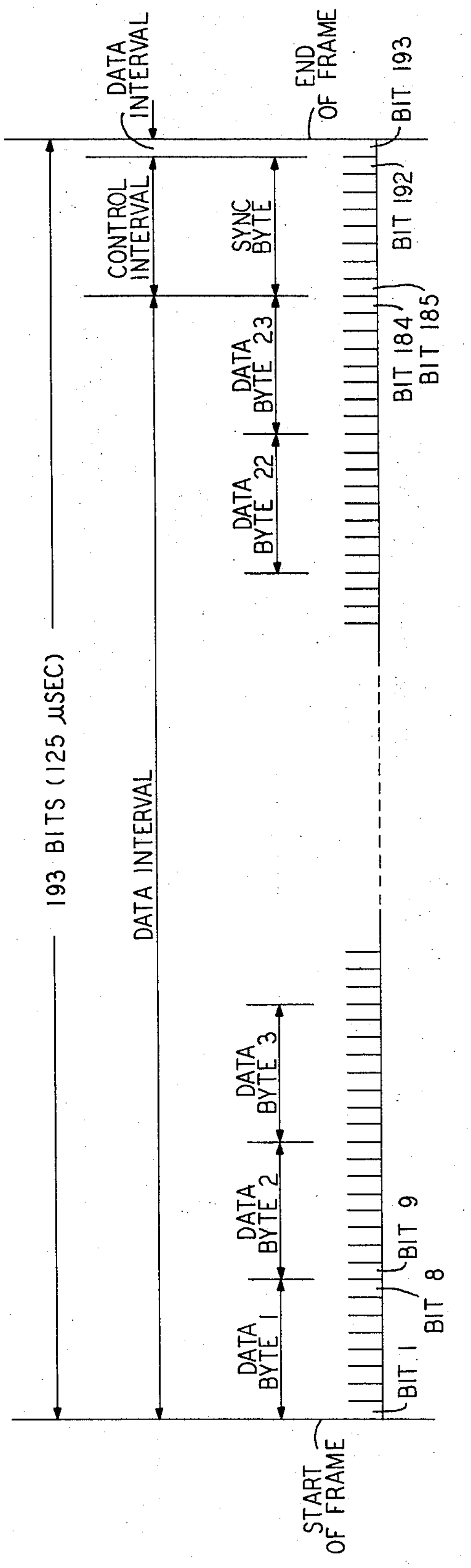
FIG. 2 shows the format of a time-division frame used in accordance with this invention.

A suitable highway time-division frame format is shown in FIG. 2. It consists of a 193-bit frame divided into 24 8-bit bytes plus one additional bit. The first 23 bytes in the frame are data bytes which are used to carry information for interchange with the 23 lines. The last nine bits of the frame (the twenty-fourth byte plus the one hundred and ninety-third bit) are used for line synchronization, control signaling, or other conventional housekeeping functions which are not part of this invention.

The apparatus in FIG. 1 includes clock and control circuit 100 and circuit modules 101 through 106. Each of circuit modules 101 through 105 controls the interchange of data signals between the time-division highway and four lines, and circuit module 106 controls the interchange of data signals between the time-division highway and lines L21 to L23. Clock and control circuit 100 produces control signals PGS1 through PGS6 directed by way of correspondingly identified leads to modules 101 through 106, respectively, as well as producing control signals PSYNC and $\overline{PSYNC}$ directed by way of correspondingly identified leads to all six of the modules. Control circuit 100 also produces clock signals LC, UC, and WCLK, which are directed to all six modules. The timing waves of the clock and control signals and functions thereof are described in detail hereinafter.

Data signals are placed on and removed from the time-division highway on a per-frame basis. The data signals on the incoming side of the time-division highway are received on terminal 114 and directed to the six circuit modules via gates 107 through 112. Gate 107 is enabled by control signal PGS1 during the first 32 bits of the frame. This allows the first four data bytes in the highway frame on the incoming side of the highway to be applied to module 101 and to be clocked in at the LC clock rate. As these four data bytes are clocked into module 101, four data bytes previously assembled (as described below) from incoming lines L1 through L4 are clocked out and transmitted at the LC clock rate to the outgoing side of the highway via OR gate 113 and terminal 115.

Gate 108 is enabled by control signal PGS2 during the second 32 bits of the frame. This, in turn, allows the second four data bytes in the highway frame on the incoming side of the highway to enter module 102 as four data bytes previously assembled from incoming lines L5 through L8 are transmitted to the outgoing side of the highway. This process continues until 23 data bytes from the incoming side of the highway have been stored in the respective circuit modules and 23 data bytes from the incoming lines have been transmitted to the outgoing side of the highway.

As the aforementioned interchange is continuing between the circuit modules and the highway, an interchange is occurring between the circuit modules and lines L1 to L23. Control signal $\overline{PSYNC}$ is high during the last or one hundred and ninety-third bit of a highway frame and during the first 23 bytes of the next highway frame; this high interval of control signal $\overline{PSYNC}$ hereinafter being identified as the "data interval." During the data interval, the eight bits of one data byte from the incoming side of each line is applied to the circuit module associated therewith, with the data byte being clocked in at the UC clock rate. As these data bytes enter the respective circuit modules, data bytes previously assembled from the incoming side of the highway (as described below) are clocked out to the outgoing side of the lines at the WCLK clock rate. This process continues until one 8-bit data byte from each of the lines has been stored in the respective circuit modules and one 8-bit data byte previously assembled from the incoming side of the highway has been clocked out to each of the outgoing lines.

Upon completion of the aforementioned interchange, which occurs in the data interval of the frame, control signal PSYNC returns low. Control signal PSYNC goes high for eight bits following the data interval. This 8-bit time slot is hereinafter identified as the "control interval." During the control interval, data bytes from the incoming side of the highway are prepared for transmission to the outgoing lines during the next frame, while data bytes from the incoming lines are prepared for transmission to the outgoing side of the highway during the next frame. During the one hundred and ninety-third bit, signal $\overline{PSYNC}$ again goes high and in the next frame the aforementioned interchange process is repeated.

Figure 3:
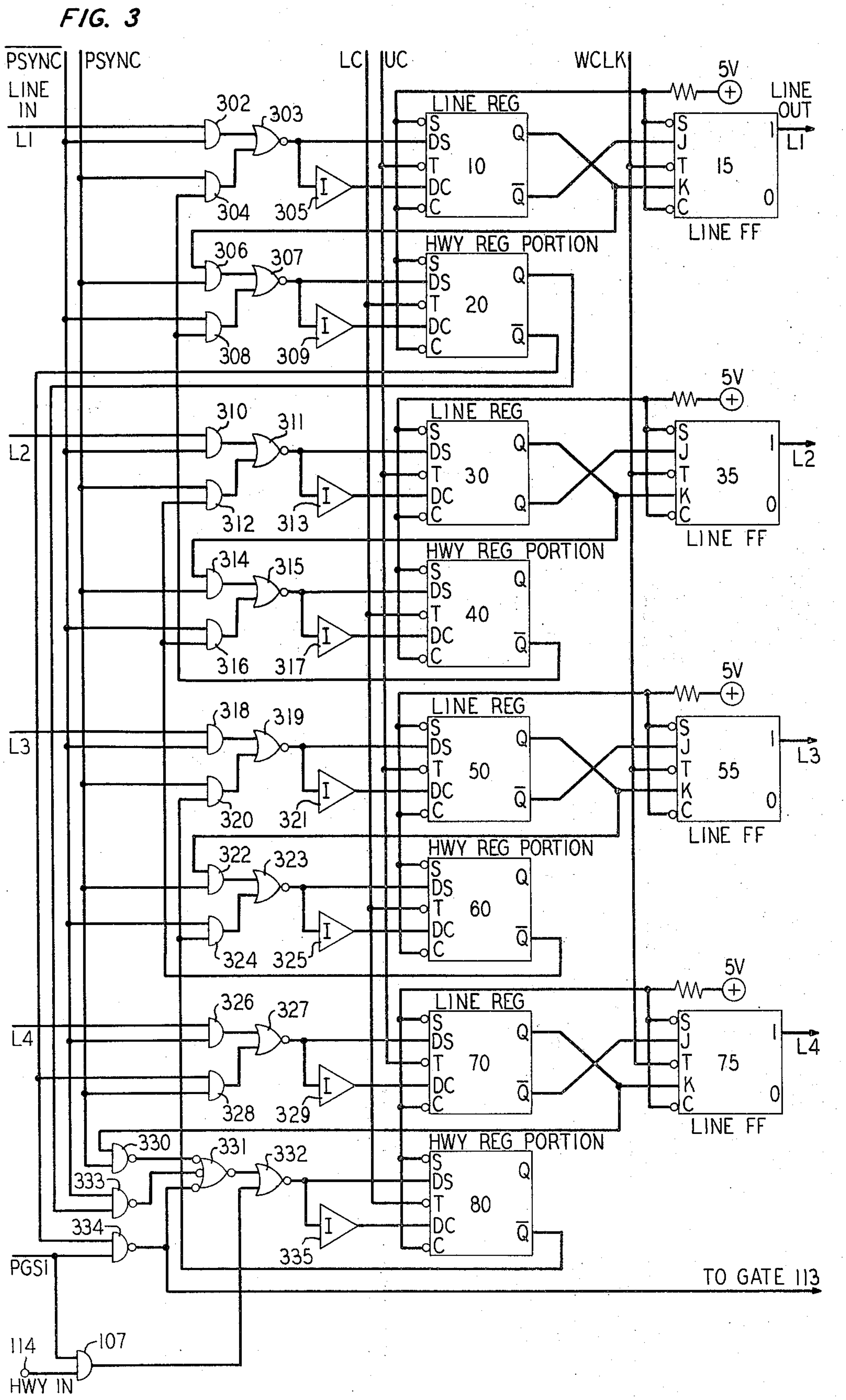
FIG. 3 discloses, in schematic form, the details of the gating logic and registers used in the bidirectional multiplexer/demultiplexer.
Figure 5:
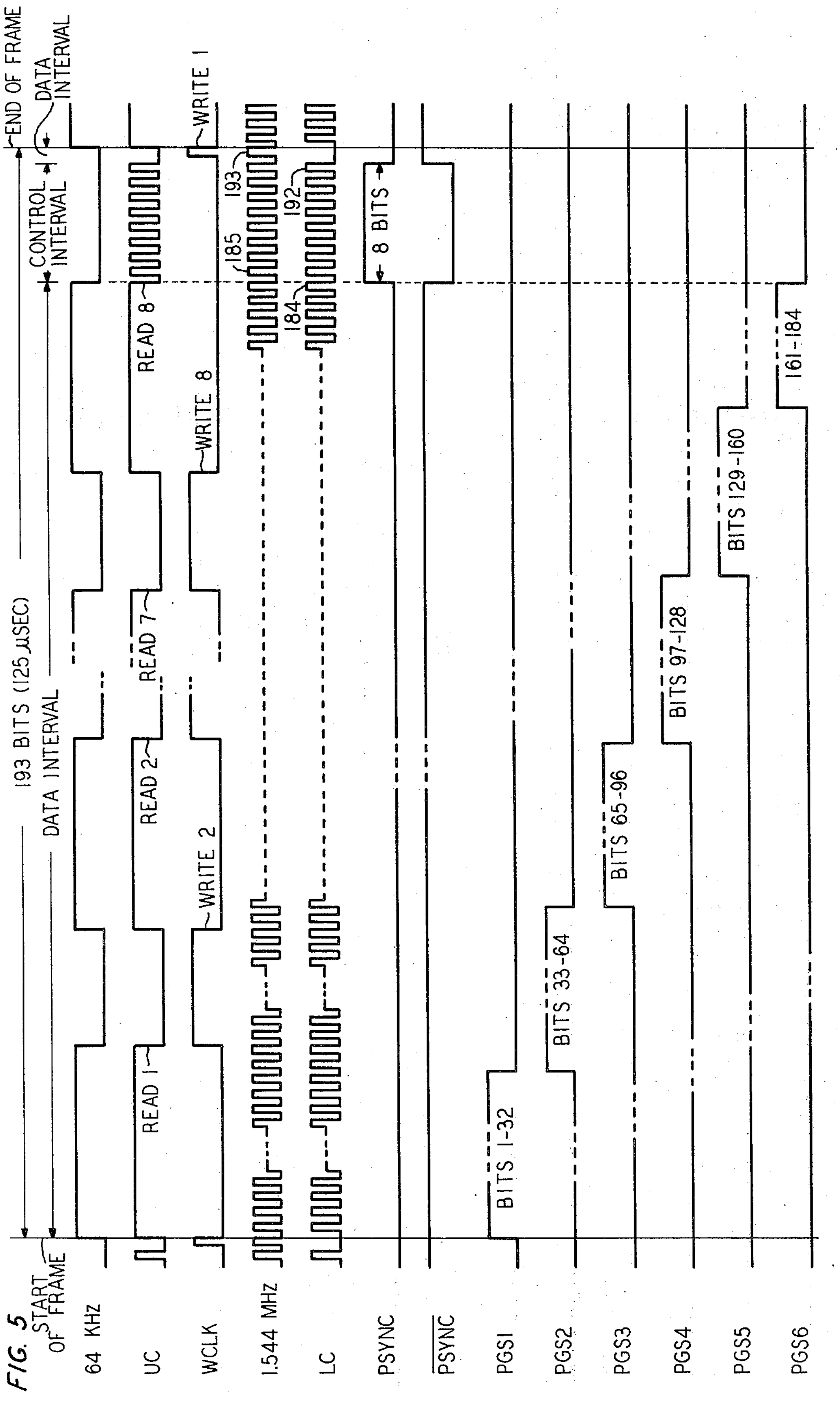
FIG. 5 discloses various timing waveforms generated by the clock and control circuitry.

Refer to FIG. 3 and FIG. 5. The circuitry shown in FIG. 3 comprises the components of a typical one of circuit modules 101 to 106, such as circuit module 101. The waveforms shown in FIG. 5 are generated by clock and control circuit 100 and selective ones thereof are directed to modules 101 through 106, as previously detailed in FIG. 1. The relationship between the waveform in FIG. 5 and the highway frame shown in FIG. 2 can be ascertained by positioning FIG. 2 and FIG. 5 such that the "Start of Frame" and "End of Frame" marks are aligned. The manner in which the waveforms shown in FIG. 5 are generated will be described in detail hereinafter.

The circuitry in FIG. 3 assembles data signals from four incoming lines, such as lines L1 through L4, and transmits the assembled data signals to the outgoing side of the time-division highway. The circuitry also accepts data signals from the incoming side of the time-division highway and distributes the accepted data signals to four outgoing lines, such as outgoing lines L1 through L4. The line registers (10, 30, 50, 70) are 8-stage shift registers clocked by clock signal UC; the highway register portions (20, 40, 60, 80) are 8-stage shift registers clocked by clock signal LC; and the line flip-flops (15, 35, 55, 75) are clocked by clock signal WCLK. Highway register portions (20, 40, 60, 80) in each circuit module form a group of portions with the groups of portions in all the modules forming the complete highway register.

In FIG. 5 it is seen that at the start of the highway frame, control signal PGS1 is high, control signal PSYNC is low and control signal $\overline{PSYNC}$ is high. Control signal PGS1, being high, enables gates 107 and 334, while signal $\overline{PSYNC}$ enables gates 302, 308, 310, 316, 318, 324, 326 and 333. Data bytes from the incoming side of the highway are therefore directed from terminal 114 through gate 107, OR gate 332 and inverter 335 to highway register portion 80. The $\overline{Q}$ output of highway register portion 80 is connected via gate 324, OR gate 323 and inverter 325 to the input of highway register portion 60. Therefore, as data bits are shifted into and through highway register portion 80, previously stored data bits are shifted out of highway register portion 80 and into highway register portion 60. The remaining highway register portions (40 and 20) are similarly connected in series, with 8-bit data bytes flowing from highway register portion 60 to highway register portion 40 (via gates 316, 315) and from highway register portion 40 into highway register portion 20 (via gates 308, 307). The Q output of highway register portion 20 is directed through gate 333 to the input of gate 331. The $\overline{Q}$ output of highway register portion 20 is directed through gate 334 to the input of gate 331 and to gate 113, shown in FIG. 1.

The inputs to gate 331 originating from gates 333 and 334 are complementary, thereby maintaining low the output from gate 331, which prevents the data bytes from the output of highway register portion 20 from entering highway register portion 80. The data bytes from highway register portion 20 flowing through gate 334 are directed, however, to the outgoing side of the time-division highway via gate 113. In this manner, as data bytes are clocked into the highway register portions from the incoming side of the time-division highway, previously stored data bytes (assembled from the incoming lines) are clocked out of the highway register portions to the outgoing side of the time-division highway.

The exchange of data bytes with the highway just described continues on module 101 as long as control signal PGS1 is high. Control signal PGS1 returns low after the first 32 bits of the frame. At the end of the thirty-second bit, the bits of the first four data bytes of the incoming highway frame now fill the stages of the highway register portions (20, 40, 60, 80) of module 101. It is now desired to keep these data bytes there until the control interval arrives (bits 185–192), at which time there will be an exchange of data bytes between the line and highway register portions (to be detailed hereinafter). Rather than stop the clocks, it was found to be advantageous to recirculate these data bytes through the group of highway register portions (portions 20, 40, 60, 80). This is accomplished as follows. When signal PGS1 goes low, gates 334 and 107 are disabled. Gate 107, being disabled, prevents data bytes from the incoming side of the time-division highway from entering highway register portion 80. Gate 334, being disabled, removes the complementary signal from gate 331 and the Q output of highway register portion 20 passes via gates 333, 331 and 332 and via inverter 335 to the input of highway register portion 80. Therefore, the data bytes now contained in the group of highway register portions (20, 40, 60, 80) begin to recirculate at the LC clock rate.

The four data bytes stored in the group of highway register portions will recirculate until the beginning of the control interval. The four data bytes stored in module 101 complete one recirculation cycle through the group of portions, while each of modules 102 through 105 are exchanging four data bytes with the time-division highway. Three-fourths of a recirculation cycle is completed while module 106 is exchanging three data bytes with the time-division highway. Therefore, at the start of the control interval, the four data bytes stored in module 101 will have made four and three-fourths recirculation cycles through the group of highway register portions. Therefore, the first data byte received by the module is now stored in highway register portion 40; the second data byte is now stored in highway register portion 60; the third data byte is in portion 80; and the fourth data byte is in portion 20.

Returning now to the end of the first 32 bits of the frame and referring to FIG. 5, it is seen that as signal PGS1 goes low, signal PGS2 goes high. This enables gate 108 (FIG. 1) and the process just described for module 101 is repeated for module 102 to interchange the second four data bytes of the incoming highway frame with the data bytes assembled from incoming lines L5 through L8. After 64 bits of the frame, signal PGS2 goes low and the four data bytes from the incoming highway stored in module 102 begin the same recirculation process just described for module 101; the four data bytes completing 3¾ recirculation cycles before the beginning of the control interval. Modules 103 through 105 complete similar operations when their respective PGS signals are high and follow similar recirculation patterns. Module 106 is dedicated to the interchange of the last three data bytes of the incoming highway, with three data bytes assembled from incoming lines L21 through L23. These data bytes are not recirculated as the control interval occurs immediately thereafter their storage in module 106. But the three data bytes are stored in portions 40, 60 and 80 at the start of the control interval. It is thus apparent that module 106 is arranged in the same manner as the other modules with the exception that highway register portion 20 is not used to store data bytes from the incoming side of the time-division highway.

As the interchange of data bytes is continuing between the time-division highway and the highway register portions, an interchange of data bits is occurring between the lines and the line registers. Each line register is clocked by clock signal UC and each line flip-flop is clocked by clock signal WCLK. On each high-to-low transition of signal UC (see FIG. 5), one bit of information is read from the incoming lines into the line registers. Data bits from line 1 on module 101, for example, pass through gate 302 (enabled by $\overline{\text{PSYNC}}$), and OR gate 303 and via inverter 305 into line register 10. Similarly, the data bits from line 2 on module 101 pass through gates 310, 311 and 313 into line register 30. On each high-to-low transition of clock signal WCLK, one data bit is written from the line registers into the line flip-flops and out to the outgoing lines. For example, data bits are clocked from line register 10 to line flip-flop 15 and then passed to the outgoing side of line L1.

With signal $\overline{\text{PSYNC}}$ high during the data interval (bits 1 to 184 of the time-division highway frame), eight data bits from each incoming line are clocked by signal UC into the respective line registers. During the data interval, eight data bits (one byte) previously accepted from the incoming side of the time-division highway and stored in the line registers are clocked out by signal WCLK to the outgoing lines. (The manner in which the data bits from the incoming highway are stored in the line registers will be detailed hereinafter.) Referring to clock signal UC in FIG. 5, it is seen that there are eight negative transitions in the data interval (between the start of the frame and bit 184 of the frame) and eight negative transitions in the control interval. During the data interval, signal $\overline{\text{PSYNC}}$ is high and the line registers therefore read eight data bits from the incoming lines into the line registers. Clock signal WCLK contains eight negative transitions, all during the data interval, with the first negative transition occurring concurrently with the end of bit 193 of the highway frame (see FIG. 5). The eight negative transitions write eight data bits (from the incoming side of the highway) now stored in the line registers into the line flip-flops and out to the outgoing lines.

By the end of the one hundred and eighty-fourth bit of the highway frame, eight data bits from each of the incoming lines have been stored in the respective line registers while eight data bits from the incoming highway previously stored in each of the line registers have been transmitted to the outgoing lines. At the same time, as previously described, 23 data bytes from the incoming highway have been stored in the 23 highway register portions and 23 data bytes previously assembled from the 23 incoming lines and stored in the highway register portions have been transmitted to the outgoing highway. It has been noted that module 106 is connected to three lines. The module is therefore arranged in the same manner as the other modules except that line register 70 and flip-flop 75 in module 106 provide no function and the fourth line connected to the register and flip-flop is removed.

The last nine bits of the highway frame are used for line synchronization, control signaling and other conventional housekeeping functions and it is not desired to interchange these bits with data bits from the incoming lines. Therefore, circuitry that is not disclosed and is not part of this invention removes the last nine bits from the incoming highway frame, for the aforementioned purposes and generates a 9-bit synchronization pattern for application to the outgoing highway. This generated pattern is transmitted to the outgoing highway after the 23 data bytes assembled from the incoming lines have been transmitted and completes the previously described frame format.

The interval during which the first eight bits of the aforementioned synchronization pattern are being transmitted to the highway comprises the control interval of the time-division frame. During this control interval, data bits from the incoming highway which have been stored in the highway register portions are serially transferred to line registers. Similarly, data signals from the incoming lines which have been stored in the line registers are serially transferred to the highway register portions.

At the end of bit 184 of the highway frame, signal PSYNC goes high and signal $\overline{\text{PSYNC}}$ goes low (see FIG. 5). In the circuit modules (FIG. 3), signal $\overline{\text{PSYNC}}$, going low, disables gates 302, 308, 310, 316, 318, 324, 326, and 333 on each of the circuit modules. This prevents data bits on the incoming lines from entering the line registers and breaks the recirculation path through the group of highway register portions. Signal PSYNC, going high, enables gates 304, 306, 312, 314, 320, 322, 328, and 330 on each of the circuit modules. This connects the output of each line register to the input of a highway register portion and the output of the highway register portion to the input of the line register. For example, the Q output of line register 10 is connected to the input of highway register portion 20 via gates 306 and 307 and inverter 309. Similarly, the $\overline{\text{Q}}$ output of highway register portion 40 is connected to the input of line register 10 via gates 304 and 303 and inverter 305. The inputs and outputs of the remaining line and highway register portions are interconnected in a similar manner, as is readily observed in FIG. 3.

To achieve the exchange of data bytes between the highway register portions and the line registers, the highway register portions are clocked by clock signal LC, while the line registers are being clocked by clock signal UC. These clock rates are now identical as signal UC follows signal LC during bits 185–192 of the time-division frame (see FIG. 5). At the end of bit 192, eight clock signals have been applied to each line register and each highway register portion, the 8-bit byte in each line register has been shifted into the particular highway register portion connected to the line register output and the 8-bit byte in each highway register portion has been shifted into the particular line register connected to the register portion output. Thus, data bytes from the incoming lines are stored in the highway register portions, waiting to be read out onto the highway, while each line register contains data bytes from the incoming highway ready to be read out to the outgoing lines.

Signal WCLK includes a negative transition which occurs in conjunction with the end of bit 193 of the highway frame, as previously noted (see FIG. 5). It has been shown above that the byte from the highway register is fully stored in the line register at the one hundred and ninety-second bit of the frame and this negative transition thus serves to write the first bit of the data byte stored in the line registers into the associated flip-flops for application to the outgoing lines, as previously described. The frame is complete at the end of bit 193. The next successive frame repeats the process just described.

Figure 4:
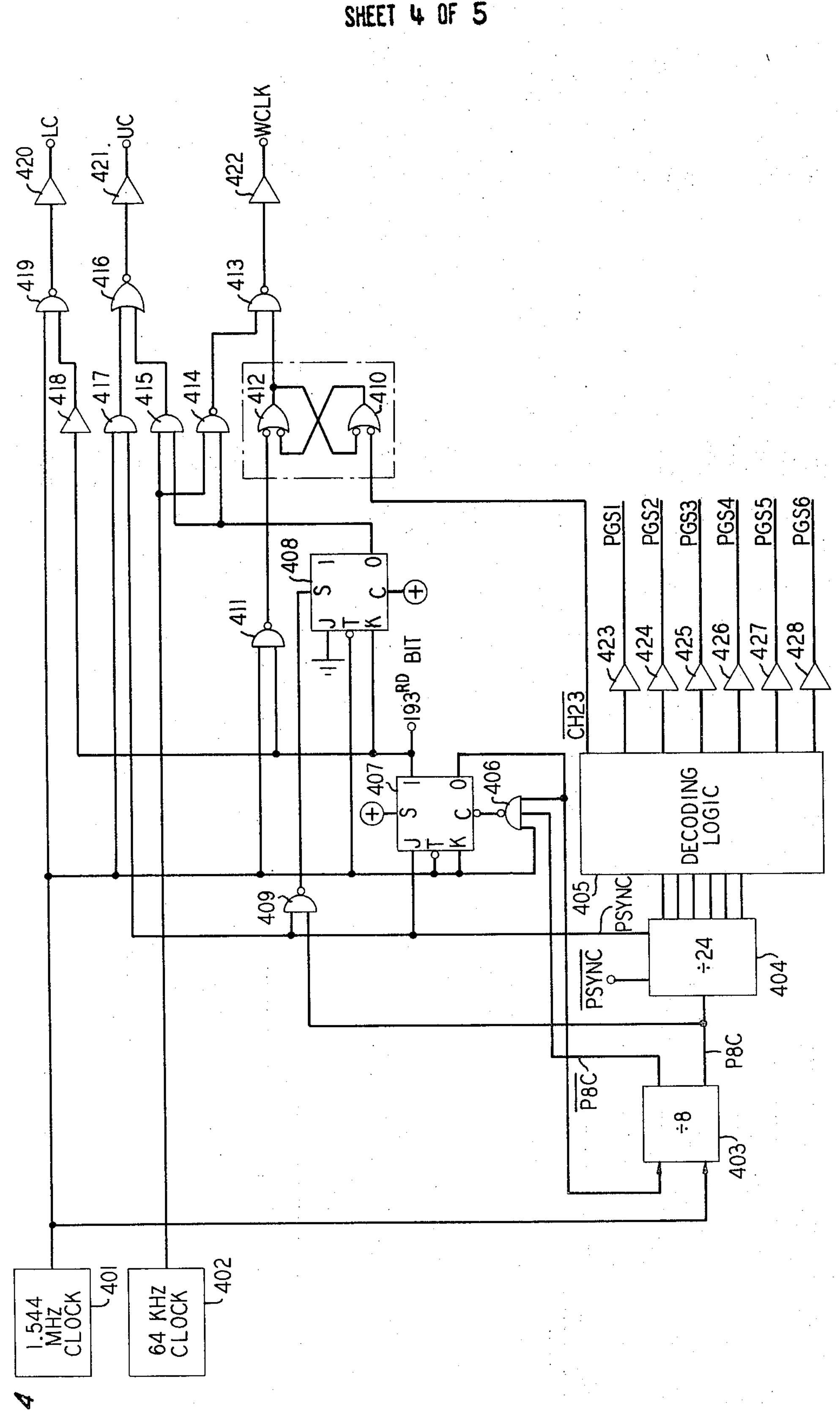
FIG. 4 depicts, in block schematic form, clock and control circuitry which cooperate with the registers and gating logic in accordance with this invention.

Refer now to FIGS. 4 and 5. FIG. 5 shows the clock signals generated by clock and control circuit 100 and FIG. 4 shows the details of that circuitry.

Clock source 401 generates a 1.544 MHz digital signal and clock source 402 generates a 64 kHz digital signal, both shown in FIG. 5. Counters 403 and 404, which are connected in series, divide by eight and 24 to form a divide-by-192 counter. Clock source 401 drives divide-by-8 counter 403, which produces signals P8C and $\overline{\text{P8C}}$. Signal P8C goes high for the second half of every eighth bit (count of eight) from clock source 401. Signal $\overline{\text{P8C}}$ is high during the first seven out of every eight pulses from clock source 401, and goes low during the middle of the eighth bit. Signal P8C drives divide-by-24 counter 404. Counter 404 produces signal PSYNC, which is high for every twenty-fourth bit from counter 403 and is thus high during eight bits of the frame (bits 185–192). Counter 404 also produces signal $\overline{\text{PSYNC}}$, which is the inverse of signal PSYNC. The various counts of counter 404 are also decoded by decoding logic 405. The decoding logic advantageously comprises a static logic network which generates a series of output signals in response to the various states of counter 404. The design of such a network is well known. See, for example, *Introduction to the Logical Design of Switching Systems*, by H. C. Torng, Addison-Wesley Publishing Co., 1964, pages 135–153. More specifically, the decoding logic generates six signals which are inverted by inverters 423–428 and routed to the circuit modules, as shown in FIG. 2. The inverted signals are: PGS1, which is high during bits 1–32 of the frame; PGS2, which is high during bits 33–64; PGS3, which is high during bits 64–96; PGS4, which is high during bits 94–128; PGS5, which is high during bits 129–160; and PGS6, which is high during bits 161–184. The decoding logic 405 also generates signal $\overline{\text{CH23}}$, which is low during bits 177–184 of the frame.

Flip-flop 407 is used to lengthen the count of the divide-by-192 counter (counter 403 and counter 404) by one bit. This is accomplished as follows. Signal PSYNC (high during bits 185–192) is sent to the J input of flip-flop 407 to enable the flip-flop to be toggled to the SET condition by the clock pulse from clock 401. However, during bits 185–191, signal $\overline{\text{P8C}}$ is high, sending a low clamping signal to the C input of flip-flop 407 through gate 406 to prevent the flip-flop from being SET. During the one hundred and ninety-second bit, $\overline{\text{P8C}}$ goes low. Upon the high-to-low transition (trailing edge) of the one hundred and ninety-second clock pulse from clock 401, flip-flop 407 becomes SET. With flip-flop 407 SET, the "0" output of this flip-flop is connected to the input of counter 403. Through gating internal to the counter (not shown) the "0" output of flip-flop 407 blocks the input to the first stage of the counter, preventing counting for one bit, which lengthens the count to 193 bits.

The LC clock signal (see FIG. 5) for the six modules is generated as follows. The waveform is generated by NAND gate 419 which follows clock source 401, except during the one hundred and ninety-third bit of the frame. During bit 193, the output of flip-flop 407 is high, the inverse is applied through inverter 408 to gate 419, the output of the gate is clamped high and inverter 420 applies a low signal to lead LC.

The UC clock signal (see FIG. 5) consists of 64 kHz clock source 402 combined with eight pulses of clock source 401 (bits 185–192). This waveform is generated as follows. Flip-flop 408 is normally in a RESET condition. Therefore, the "0" output of flip-flop 408 is normally high, which enables AND gate 415 and directs 64 kHz clock source through gate 415, OR gate 416 and inverter 421 to lead UC and, thus, to the circuit module boards. At the end of bit 184 of the frame, signal P8C and signal PSYNC are both high. This enables gate 409, which sets flip-flop 408, which, in turn, disables gate 415. When PSYNC goes high, gate 417 is also enabled, which directs 1.544 MHz clock source 401 through gates 417, 416, and inverter 421 to lead UC and then to the six module boards. Therefore, during bits 185–192 of the frame, the UC clock signals consist of eight bits of clock source 401. Flip-flop 408 is reset at the end of bit 193 by the "1" output of flip-flop 407 being connected to the K input of flip-flop 408. At this point, the UC clock signals return to the 64 kHz rate.

The WCLK signal is the inverse of the 64 kHz clock source through bits 177 of the frame and remains low thereafter except for the second half of bit 193 (see FIG. 5). This waveform is generated in the following manner. Flip-flop 408 is in a RESET condition through bits 1–184 of the frame, as previously described. This enables gate 414, which inverts 64 kHz clock source 402 and applies it to the input of gate 413. Gates 410 and 412 form a flip-flop which is normally reset and is set by a low on the $\overline{\text{CH23}}$ signal lead which occurs during bits 177–184 of the frame. Therefore, during bits 1–177 of the frame, the output of gate 412 is high, which enables gate 413 to pass inverted the 64 kHz signal. The 64 kHz signal is again inverted by inverter 422, from which clock signal WCLK is distributed to the circuit modules.

The $\overline{CH23}$ signal goes low at the end of bit 177 of the frame, thereby resetting the flip-flop formed by gates 410 and 412, which causes the output of gate 412 to go low. At this time the 64 kHz clock signal is high. The 64 kHz clock signal is inverted by gate 414 and applied to the input of gate 413. Therefore, both inputs to gate 413 are low, which clamps its output high. This level is inverted by inverter 422, which holds WCLK low. Following bit 184 of the frame, the 64 kHz clock signal goes low. Therefore, the output of gate 414 goes high, which places a high on one input of gate 413. The other input, however, is the output of gate 412, which is low. Therefore, the output of gate 413 remains high and signal WCLK remains low.

AND gate 411 is controlled by the clock 401 1.544 MHz signsl and the "1" output of flip-flop 407. Gate 411 therefore generates a waveform which goes low during the second half of the one hundred and ninety-third bit. When this goes low the flip-flop formed by gates 410 and 412 is RESET, allowing WCLK to go high. At the end of the one hundred and ninety-third bit, the "0" output of flip-flop 408 goes high. At the same time, the 64 kHz clock also goes high and, via gates 414 and 413, WCLK goes low. For the remaining seven of the eight pulses of the 64 kHz clock in the frame, WCLK will be the inverse of the 64 kHz clock.

Although a specific embodiment of this invention has been shown and described it will be understood that various modifications may be made without departing from the spirit of this invention and within the scope of the appended claims.

I claim:

1. Apparatus for multiplexing data signals from incoming lines onto a time-division highway and for distributing data signals from the time-division highway onto outgoing lines, each data signal occupying a time slot in a frame on the time-division highway, each frame, consisting of a data interval dedicated to the data signal time slots and a control interval of at least one additional time slot, the apparatus comprising:

- a plurality of line registers, each line register dedicated to an incoming and outgoing line pair;
- a highway register having a plurality of portions equal in number to the plurality of line registers;
- means operative during the data interval of the time-division frame for storing individual ones of the data signals from the time-division highway in each of the several portions of the highway register and for applying a data signal previously stored in each of the several portions of the highway register to the time-division highway;
- means operative during the data interval of the time-division frame for storing a data signal from each incoming line into the line register dedicated thereto and for reading out a data signal previously stored in each line register to the outgoing line dedicated thereto; and
- means operative during the control interval for reading out the data signal stored in each of the highway register portions, for reading out the data signal stored in each of the line registers, for inserting the data signal read out from each highway register portion into a particular one of the line registers and for inserting the data signal read out from each line register into a particular one of the highway register portions.

2. Apparatus in accordance with claim 1 wherein successive ones of the portions are arranged to form groups of portions, each group of portions including input gating means and output gating means for recirculating the data signals distributed thereto through the successive portions of the group to an output of the group of portions and back to an input of the group of portions.

3. Apparatus in accordance with claim 1 wherein the data signals are carried by each of the lines in a time-division sequence, each data signal consisting of a multibit data byte, each line register comprising a shift register having a plurality of stages corresponding in number to the number of bits in the data byte, each line register stage including means for storing one bit of the data byte, each highway register portion comprising a shift register having a plurality of stages corresponding in number to the number of stages in each line register, and each highway register stage including means for storing one bit of the data byte.

4. Apparatus in accordance with claim 3 wherein the means operative during the control interval comprises means for serially gating the bits of the data byte stored in each line register into an input of a particular one of the highway register portions and for serially gating the bits of the data byte stored in each highway register portion to an input of a particular one of the line registers.

5. Apparatus for performing a bi-directional interchange of multibit data bytes between a plurality of two-way lines and a two-way time-division highway, each multibit data byte occupying a time slot in a frame on the time-division highway, each frame consisting of a data interval defining the time slots and a control interval, the apparatus comprising:

- a line register dedicated to each two-way line for storing a data byte, each line register having an input and an output;
- a highway register having a plurality of portions equal in number to the plurality of line registers, each portion for storing a data byte and having an input and an output;
- first means effective during the data interval for steering data bytes from the time-division highway to the inputs of the highway register portions, and for transmitting data bytes previously stored in the highway register portions to the time-division highway;
- second means effective during the data interval for gating data bytes from each line to the input of the line register dedicated thereto and for gating data bytes previously stored in the line register to the dedicated line; and
- means effective during the control interval for serially reading out from the output of each line register the bits of the data byte stored therein, for serially reading out from the output of each highway register portion the bits of the data bytes stored therein, and for serially writing into the input of a particular line register the bits of the data byte read from the highway register portion and for serially writing into the input of a particular highway register portion the bits of the data byte read from the line register.

6. Apparatus in accordance with claim 5 wherein successive portions are arranged to form groups of portions, the apparatus further including distribution means for distributing data bytes from the time-division highway to successive groups of highway register portions.

7. Apparatus in accordance with claim 5 further including a first source of pulses having a repetition rate corresponding to the signaling rate of the time-division highway, and a second source of pulses having a repetition rate corresponding to the signaling rate of the lines, the first means including means for shifting data bits through the highway register portions at the rate of the first source of pulses, the second means including means for shifting data bits through the line registers at the rate of the second source of pulses, and the means effective during the control interval including means for shifting data bits through the line registers and the highway register portions at the rate of the first source of pulses.

8. In a system for distributing data signals from a time-division highway to a plurality of lines, each data signal occupying a time slot in a frame on the time-division highway, each frame consisting of a data interval defining the data signal time slots and a control interval:

- a plurality of line registers, each of the line registers dedicated to one of the lines;
- a highway register having a plurality of portions, equal in number to the plurality of line registers, successive portions being arranged to form groups of portions;
- means operative during the data interval for distributing data signals from the time-division highway to successive groups of portions of the highway register;
- means operative during the control interval for gating data signals from each highway register portion to a particular one of the line register; and
- means connected to each group of portions and operative during the data interval for recirculating the data signals distributed thereto through the successive portions of the group to a final one of the portions and back to an initial one of the portions.

9. In a system in accordance with claim 8 wherein each data signal consists of a multibit data byte, each highway register portion comprising a shift register having a plurality of stages corresponding in number to the number of bits in the data byte, the recirculating means including means for serially shifting the bits of the data byte through the stages of successive ones of the shift registers in the group to a final stage of a final shift register of the group and back to an initial stage of an initial shift register of the group.

10. In a system in accordance with claim 8 further including means operative during the data interval for gating data signals from an output of each line register to the line dedicated thereto.

11. Apparatus for performing a bi-directional interchange of data signals between two shift registers, comprising:

- first shifting means for serially applying data signals at a first rate to the input of one of the registers and for obtaining data signals from the output of the one register at the first rate;
- second shifting means for serially applying data signals at a second rate to the input of the other register and for obtaining data signals from the output of the other register at the second rate;
- means for normally connecting the input of the one register to a first source and the output to a first sink, and for normally connecting the input of the other register to a second source and the output to a second sink; and
- switching means for interconnecting the output of the one register to the input of the other register and for interconnecting the output of the other register to the input of the one register, said switching means including means for operating both the first and second shifting means at the second rate.

12. Apparatus in accordance with claim 11 wherein each data signal consists of a multibit data byte, each shift register having a plurality of stages corresponding in number to the number of bits in the data byte, each stage including means for storing one bit of the data byte.

13. Apparatus in accordance with claim 12 wherein the first shifting means includes a first source of pulses for generating shifting signals at the first rate and the second shifting means includes a second source of pulses for generating shifting signals at the second rate, said first shifting means responsive to the first source of pulses for shifting the bits of the data byte through the several stages of the one register at the first rate and said second shifting means responsive to the second source of pulses for shifting the bits of the data byte through the several stages of the other register at the second rate.

14. Apparatus in accordance with claim 13 wherein the operating means includes means for combining the first source of pulses with the second source of pulses to produce shifting signals for operating both the first and second shifting means at the second rate.

15. In a system for multiplexing data signals from a plurality of incoming lines onto a two-way highway and for distributing incoming data signals from the highway onto a plurality of outgoing lines, the lines and highway accommodating the data signals during concurrent frame intervals;

- a delay line dedicated to each incoming and outgoing line pair and having a delay equal to the frame interval for delaying an incoming data signal from the dedicated incoming line and for applying a delayed data signal to the outgoing dedicated line;
- a delay line dedicated to the highway and having a delay equal to the frame interval for delaying the incoming data signals from the highway and for applying delayed data signals to the highway, the highway delay line further being divided into portions for individually delaying a data signal, each portion associated with a line delay line; and
- means effective between each frame interval for interchanging the data signal delayed by each of the line delay lines and the data signal delayed by the highway delay line portion, the interchanging means including means for modifying the delay of the line delay line to correspond to the delay of the associated highway delay line portion during the interchange.

16. In a system in accordance with claim 15 wherein each data signal consists of a multibit data byte, each line delay line comprises a shift register having a plurality of stages corresponding in number to the number of bits in the data byte, each line register stage includes means for storing one bit of the data byte, each highway delay line portion comprises a shift register having a plurality of stages corresponding in number to the number of stages in the line register, and each stage of the highway register portion included means for storing one bit of the data byte.

17. In a system in accordance with claim 16 wherein each line register includes shifting means for shifting bits through the several stages at a rate equal to the signaling rate of the data signals on the incoming and outgoing line pair, each highway register portion includes shifting means for shifting bits through the several stages at a rate equal to the signaling rate of the data signals on the two-way highway and the modifying means includes means for shifting bits through the several stages of the line register at a rate equal to the signaling rate of the two-way highway.

18. In a system in accordance with claim 16 wherein the line register shifting means and the highway register shifting means includes means for generating shifting signals and wherein the modifying means further includes means for superimposing the shifting signals derived from the highway register shifting means onto the shifting signals derived from the line register shifting means.

19. In a system in accordance with claim 18 wherein the interchanging means includes means for serially transferring the bits of the data byte from an output of each line register to a particular one of the highway register portions and for simultaneously serially transferring the bits of the data byte from the highway register portion to an input of a particular one of the line registers.

* * * * *